United States Patent
Estevez

(10) Patent No.: US 12,507,125 B2
(45) Date of Patent: Dec. 23, 2025

(54) MONITORING FOR APPLICATION AI/ML-BASED SERVICES AND OPERATIONS

(71) Applicant: Samsung Electronics Co., Ltd., Suwon-si (KR)

(72) Inventor: David Gutierrez Estevez, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 18/192,437

(22) Filed: Mar. 29, 2023

(65) Prior Publication Data

US 2023/0319646 A1 Oct. 5, 2023

(30) Foreign Application Priority Data

Mar. 29, 2022 (GB) .................................. 2204491
Aug. 24, 2022 (GB) .................................. 2212329
Mar. 22, 2023 (GB) .................................. 2304171

(51) Int. Cl.
*H04W 28/24* (2009.01)
*H04W 8/18* (2009.01)
*H04W 76/38* (2018.01)

(52) U.S. Cl.
CPC ............. *H04W 28/24* (2013.01); *H04W 8/18* (2013.01); *H04W 76/38* (2018.02)

(58) Field of Classification Search
CPC ........ H04W 8/18; H04W 28/24; H04W 76/38
See application file for complete search history.

(56) References Cited

U.S. PATENT DOCUMENTS 11,917,527 B2 * 2/2024 Chou .................... H04W 24/02
12,218,747 B2 * 2/2025 Kim ..................... H04L 41/0894
(Continued)

FOREIGN PATENT DOCUMENTS

WO 2018008980 A1 1/2018
WO 2021045573 A1 3/2021
(Continued)

OTHER PUBLICATIONS

International Search Report and Written Opinion of the International Searching Authority dated Jun. 21, 2023, in connection with International Application No. PCT/KR2023/004195, 8 pages.
(Continued)

*Primary Examiner* — Melanie Jagannathan

(57) ABSTRACT

A 5G or 6G communication system for supporting a higher data transmission rate. A method for monitoring events in a network comprises: subscribing, by an Application Function (AF), to monitoring the events, wherein the AF supports one or more AIML-based services and/or operations, and the events relate to the performance of the AIML-based services and/or operations; in response to the subscribing, monitoring, by a User Plane Function (UPF), the events; and when an event is detected, reporting, by the UPF to a Network Exposure Function (NEF), the event. The monitoring events may comprise one or more of: monitoring session inactivity of a PDU session; monitoring traffic volume of a PDU session; monitoring PCF events; per-5QI monitoring; and monitoring of edge resources. The monitoring may comprise QoS monitoring and may be performed for multiple UEs.

20 Claims, 3 Drawing Sheets

(56) References Cited

U.S. PATENT DOCUMENTS

| | | | |
|---|---|---|---|
| 2019/0364541 A1 | 11/2019 | Ryu | |
| 2021/0099367 A1* | 4/2021 | Han | H04L 43/026 |
| 2021/0281658 A1 | 9/2021 | Kweon et al. | |
| 2021/0297876 A1* | 9/2021 | Bellamkonda | G06N 20/00 |
| 2022/0337995 A1 | 10/2022 | Baek et al. | |
| 2022/0394434 A1* | 12/2022 | Lee | H04W 68/005 |
| 2023/0171168 A1* | 6/2023 | Kedalagudde | H04L 41/0894 370/254 |
| 2023/0199868 A1* | 6/2023 | Kedalagudde | H04L 67/141 370/328 |
| 2023/0309158 A1* | 9/2023 | Qiao | H04W 72/1268 |
| 2023/0319533 A1* | 10/2023 | Ly | H04L 43/04 709/224 |
| 2024/0205781 A1* | 6/2024 | Li | H04W 36/32 |
| 2024/0243984 A1* | 7/2024 | Soldati | H04L 43/08 |
| 2024/0259879 A1* | 8/2024 | Ranganath | H04L 41/5054 |
| 2025/0097158 A1* | 3/2025 | Kim | H04L 47/24 |
| 2025/0106658 A1* | 3/2025 | Olvera-Hernandez | H04W 24/08 |
| 2025/0142398 A1* | 5/2025 | Luo | H04W 28/0252 |
| 2025/0203433 A1* | 6/2025 | Kheirkhah | H04W 24/02 |

FOREIGN PATENT DOCUMENTS

| | | |
|---|---|---|
| WO | 2021063844 A1 | 4/2021 |
| WO | 2023141964 A1 | 8/2023 |
| WO | 2023143382 A1 | 8/2023 |

OTHER PUBLICATIONS

3GPP TS 23.288 V17.4.0 (Mar. 2022), Technical Specification, 3rd Generation Partnership Project; Technical Specification Group Services and System Aspects; Architecture enhancements for 5G System (5GS) to support network data analytics services (Release 17), Mar. 2022, 205 pages.

3GPP TS 23.502 V17.4.0 (Mar. 2022), Technical Specification, 3rd Generation Partnership Project; Technical Specification Group Services and System Aspects; Procedures for the 5G System (5GS); Stage 2 (Release 17), Mar. 2022, 738 pages.

3GPP TS 29.512 V17.6.0 (Mar. 2022), Technical Specification, 3rd Generation Partnership Project; Technical Specification Group Core Network and Terminals; 5G System; Session Management Policy Control Service; Stage 3 (Release 17), Mar. 2022, 254 pages.

Oppo, "5GS Assisted AIML Services and Transmissions (FS_5GAIML)," 3GPP TSG-SA WG2 Meeting #145E, Electronic meeting, May 17-28, 2021, 17 pages.

3GPP TS 22.261 V18.5.0 (Dec. 2021) Technical Specification, 3rd Generation Partnership Project; Technical Specification Group Services and System Aspects; Service requirements for the 5G system; Stage 1 (Release 18), Dec. 2021, 115 pages.

3GPP TS 23.288 V17.2.0 (Sep. 2021) Technical Specification, 3rd Generation Partnership Project; Technical Specification Group Services and System Aspects; Architecture enhancements for 5G System (5GS) to support network data analytics services (Release 17), Sep. 2021, 196 pages.

3GPP TS 23.501 V17.3.0 (Dec. 2021) Technical Specification, 3rd Generation Partnership Project; Technical Specification Group Services and System Aspects; System architecture for the 5G System (5GS); Stage 2 (Release 17), Dec. 2021, 559 pages.

3GPP TS 23.502 V17.3.0 (Dec. 2021) Technical Specification, 3rd Generation Partnership Project; Technical Specification Group Services and System Aspects; Procedures for the 5G System (5GS); Stage 2 (Release 17), Dec. 2021, 727 pages.

Combined Search and Examination Report dated Sep. 21, 2023, in connection with British Patent Application No. GB2212329.3, 8 pages.

Combined Search and Examination Report dated Oct. 10, 2023, in connection with British Patent Application No. GB2304171.8, 8 pages.

3GPP TR 23.700-80 V0.3.0 (May 2022), Technical Report, 3rd Generation Partnership Project; Technical Specification Group Services and System Aspects; Study on 5G System Support for AI/ML-based Services (Release 18), May 2022, 169 pages.

Ericsson, "KI#6, Sol#37—removing Editor's Notes," (revision of S2-220xxxx); 3GPP TSG-WG SA2 Meeting #152E, Aug. 17-26, 2022, 10 pages.

Examination Report dated Sep. 9, 2024, in connection with United Kingdom Application No. GB2304171.8, 4 pages.

Supplementary European Search Report dated May 20, 2025, in connection with European Application No. 23781358.9, 13 pages.

Examination Report dated May 12, 2025, in connection with United Kingdom Application No. GB2212329.3, 4 pages.

Examination Report dated May 12, 2025, in connection with United Kingdom Application No. GB2304171.8, 4 pages.

3GPP TR 23.700-80 70.4.0 (Aug. 2022), Technical Report, 3rd Generation Partnership Project; Technical Specification Group Services and System Aspects; Study on 5G System Support for AI/ML-based Services (Release 18), Aug. 2022, 208 pages.

Samsung, "New SID on 5G System Evolution for AI/ML-based Services," SA WG2 Meeting #145e (e-meeting), May 17-28, 2021, 3 pages.

* cited by examiner

MONITORING FOR APPLICATION AI/ML-BASED SERVICES AND OPERATIONS

CROSS-REFERENCE TO RELATED APPLICATIONS

This application is based on and claims priority under 35 U.S.C. § 119 to GB Patent Application Nos. 2204491.1, 2212329.3, and 2304171.8 filed on Mar. 29, 2022, Aug. 24, 2022, and Mar. 22, 2023, in the UKIPO, the disclosure of which is incorporated by reference herein in its entirety.

BACKGROUND

1. Field

Certain examples of the present disclosure provide techniques relating to Artificial Intelligence (AI) and/or Machine Leaning (ML), in particular techniques relating to monitoring application AI/ML operation. For example, certain examples of the present disclosure provide methods, apparatus and systems in 3rd Generation Partnership Project (3GPP) 5th Generation (5G) System (5GS) for monitoring one or more features (e.g., network resource utilization and/or Quality of Service (QoS)) for application AI and/or ML operation.

2. Description of Related Art

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

The present disclosure is defined in the independent claims. Advantageous features are defined in the dependent claims.

Embodiments or examples disclosed in the description and/or figures falling outside the scope of the claims are to be understood as examples useful for understanding the present disclosure.

Other aspects, advantages and salient features of the disclosure will become apparent to those skilled in the art from the following detailed description taken in conjunction with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
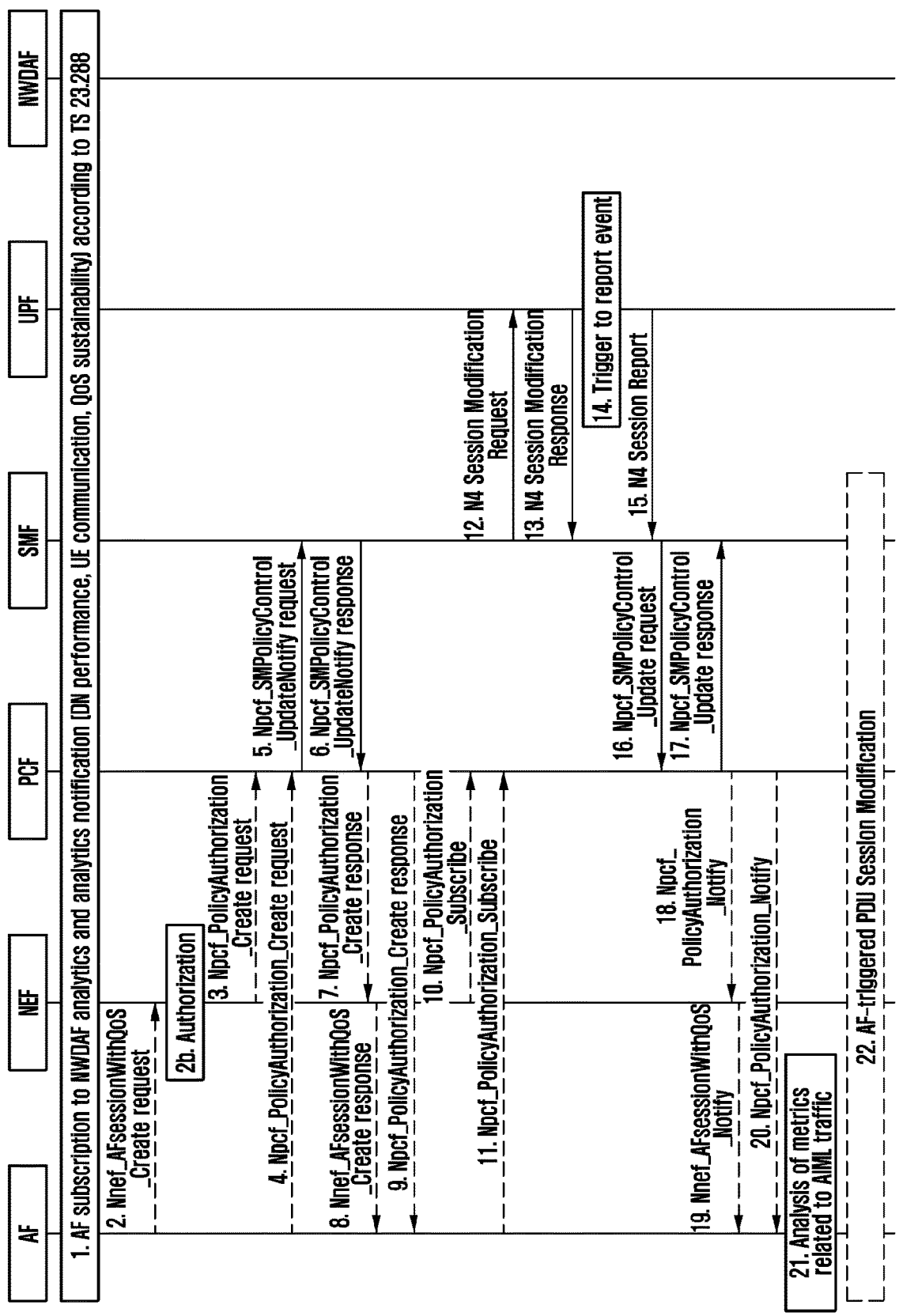
FIG. 1 illustrates an example call flow according to an example of the present disclosure.
Figure 2:
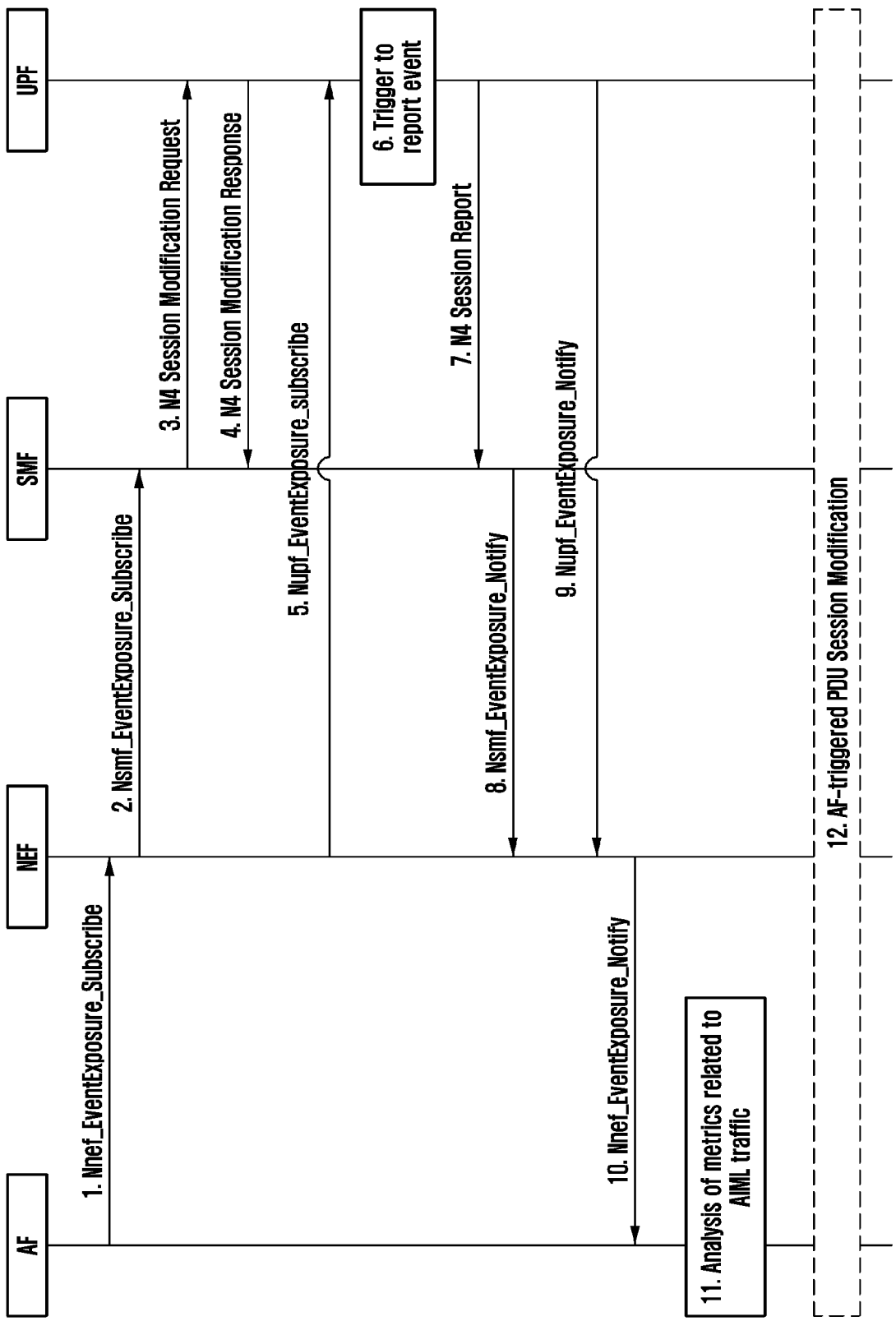
FIG. 2 illustrates an example call flow according to another example of the present disclosure.
Figure 3:
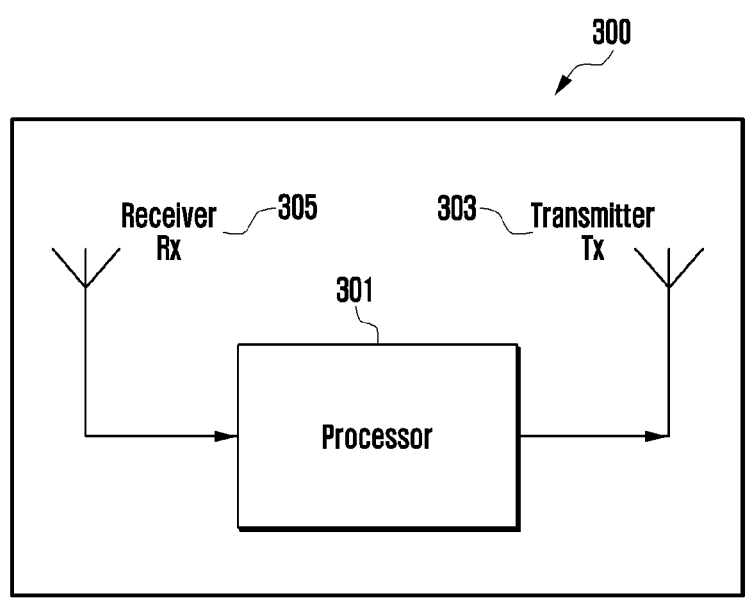
FIG. 3 illustrates a block diagram of an exemplary network entity that may be used in certain examples of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Herein, the following documents are referenced:
[1] 3GPP TS 22.261 (e.g., V18.5.0)
[2] 3GPP TS 23.501 (e.g., V17.3.0)
[3] 3GPP TS 23.502 (e.g., V17.3.0)
[4] 3GPP TS 23.288 (e.g., V17.2.0)

AI/ML is being used in a range of application domains across industry sectors. In mobile communications systems, conventional algorithms (e.g., speech recognition, image recognition, video processing) in mobile devices (e.g., smartphones, automotive, robots) are being increasingly replaced with AI/ML models to enable various applications.

The 5G system can support various types of AI/ML operations, in including the following three defined in [1]:

AI/ML Operation Splitting Between AI/ML Endpoints

The AI/ML operation/model may be split into multiple parts, for example according to the current task and environment. The intention is to offload the computation-intensive, energy-intensive parts to network endpoints, and to leave the privacy-sensitive and delay-sensitive parts at the end device. The device executes the operation/model up to a specific part/layer and then sends the intermediate data to the network endpoint. The network endpoint executes the remaining parts/layers and feeds the inference results back to the device.

AI/ML Model/Data Distribution and Sharing Over 5G System

Multi-functional mobile terminals may need to switch an AI/ML model, for example in response to task and environment variations. An assumption of adaptive model selection is that the models to be selected are available for the mobile device. However, since AI/ML models are becoming increasingly diverse, and with the limited storage resource in a UE, not all candidate AI/ML models may be pre-loaded on-board. Online model distribution (i.e., new model downloading) may be needed, in which an AI/ML model can be distributed from a Network (NW) endpoint to the devices when they need it to adapt to the changed AI/ML tasks and environments. For this purpose, the model performance at the UE may need to be monitored constantly.

Distributed/Federated Learning Over 5G System

A cloud server may train a global model by aggregating local models partially trained by each of a number of end devices (e.g., UEs). Within each training iteration, a UE performs the training based on a model downloaded from the AI server using local training data. Then the UE reports the interim training results to the cloud server, for example via 5G UL channels. The server aggregates the interim training results from the UEs and updates the global model. The updated global model is then distributed back to the UEs and the UEs can perform the training for the next iteration.

Different levels of interactions are expected between UE and AF as AI/ML endpoints, for example based on [1], to exchange AI/ML models, intermediate data, local training data, inference results and/or model performance as Application AI/ML traffic. However support for the transmission of Application AI/ML traffic, for example over 5GS, between AI/ML endpoints (e.g., UE and AF) as described above is not currently defined in the existing 5GC data transfer/traffic routing mechanisms.

3GPP approved a study item for Rel-18 in SA WG2 focused on 5G System Support for AI/ML-based Services. As part of this study, an issue (i.e., problem statement) was approved with the scope of monitoring the network resource utilization for support of Application AI/ML operations. Another issue was also approved with the scope of Quality of Service (QoS) and policy enhancements for AI/ML-based services. As part of this issue, it was agreed to study QoS monitoring aspects to support the operation of the 3rd party AI/ML operation.

NWDAF represents an (operator-managed) network analytics logical function providing (slice specific) network data analytics to NFs and/or AFs. A NF or AF may subscribe to network analytics provided by NWDAF. NWDAF collects data from NFs, AFs and/or OAM and derives network analytics. NWDAF provides suitable network analytics to subscribed NFs and/or AFs, for example based on triggering events.

The following is stated in 3GPP TS 23.501 V17.2.0, Clause 6.2.18:
  The Network Data Analytics Function (NWDAF) includes one or more of the following functionalities:
    Support data collection from NFs and AFs;
    Support data collection from OAM;
    NWDAF service registration and metadata exposure to NFs and AFs;
    Support analytics information provisioning to NFs and AFs;
    Support Machine Learning (ML) model training and provisioning to NWDAFs (containing Analytics logical function).
  The details of the NWDAF functionality are defined in TS 23.288 [86].

The following is stated in 3GPP TS 23.288 V17.2.0, Clause 4.1:
  The NWDAF (Network Data Analytics Function) is part of the architecture specified in TS 23.501 [2] and uses the mechanisms and interfaces specified for 5GC in TS 23.501 [2] and OAM services (see clause 6.2.3.1).
  The NWDAF interacts with different entities for different purposes:
    Data collection based on subscription to events provided by the AMF, SMF, PCF, UDM, AF (directly or via NEF), and OAM;
    [Optionally] Analytics and Data collection using the DCCF (Data Collection Coordination Function);
    Retrieval of information from data repositories (e.g., UDR via UDM for subscriber-related information);
    [Optionally] Storage and retrieval of information from the ADRF (Analytics Data Repository Function);
    [Optionally] Analytics and Data collection from the MFAF (Messaging Framework Adaptor Function);
    Retrieval of information about NFs (e.g., from NRF for NF-related information);
    On demand provision of analytics to consumers, as specified in clause 6.
    Provision of bulked data to consumers, as specified in clause 6.
  A single instance or multiple instances of NWDAF may be deployed in a PLMN. If multiple NWDAF instances are deployed, the architecture supports deploying the NWDAF as a central NF, as a collection of distributed NFs, or as a combination of both. If multiple NWDAF instances are deployed, an NWDAF can act as an aggregate point (i.e., Aggregator NWDAF) and collect analytics information from other NWDAFs, which may have different Serving Areas, to produce the aggregated analytics (per Analytics ID), possibly with Analytics generated by itself.
    NOTE 1: When multiple NWDAFs exist, not all of them need to be able to provide the same type of analytics results, i.e., some of them can be specialized in providing certain types of analytics. An Analytics ID information element is used to identify the type of supported analytics that NWDAF can generate.
    NOTE 2: NWDAF instance(s) can be collocated with a 5GS NF.

The above information is presented as background information only to assist with an understanding of the present disclosure. No determination has been made, and no assertion is made, as to whether any of the above might be applicable as prior art with regard to the present disclosure.

The following description of examples of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the examples described herein can be made without departing from the scope of the disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the disclosure.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim are to be understood to be applicable to any other aspect, embodiment, example or claim described herein unless incompatible therewith.

Certain examples of the present disclosure provide techniques relating to Artificial Intelligence (AI) and/or Machine Leaning (ML), in particular techniques relating to monitoring application AI/ML operation. For example, certain examples of the present disclosure provide methods, apparatus and systems in 3rd Generation Partnership Project (3GPP) 5th Generation (5G) System (5GS) for monitoring one or more features (e.g., network resource utilisation and/or Quality of Service (QoS)) for application AI and/or ML operation.

However, the skilled person will appreciate that the present disclosure is not limited to these examples, and may be applied in any suitable system or standard, for example one or more existing and/or future generation wireless communication systems or standards, including any existing or future releases of the same standards specification, for example 3GPP 5G.

The following examples are applicable to, and use terminology associated with, 3GPP 5G. However, the skilled person will appreciate that the techniques disclosed herein are not limited to 3GPP 5G. For example, the functionality of the various network entities and other features disclosed herein may be applied to corresponding or equivalent entities or features in other communication systems or standards. Corresponding or equivalent entities or features may be regarded as entities or features that perform the same or similar role, function or purpose within the network.

The skilled person will also appreciate that the transmission of information between network entities is not limited to the specific form, type or order of messages described in relation to the examples disclosed herein.

A particular network entity may be implemented as a network element on a dedicated hardware, as a software instance running on a dedicated hardware, and/or as a virtualized function instantiated on an appropriate platform, e.g., on a cloud infrastructure.

The skilled person will appreciate that the present disclosure is not limited to the specific examples disclosed herein. For example:
  The techniques disclosed herein are not limited to 3GPP 5G.
  One or more entities in the examples disclosed herein may be replaced with one or more alternative entities performing equivalent or corresponding functions, processes or operations.
  One or more of the messages in the examples disclosed herein may be replaced with one or more alternative messages, signals or other type of information carriers that communicate equivalent or corresponding information.
  One or more further entities and/or messages may be added to the examples disclosed herein.
  One or more non-essential entities and/or messages may be omitted in certain examples.
  The functions, processes or operations of a particular entity in one example may be divided between two or more separate entities in an alternative example.
  The functions, processes or operations of two or more separate entities in one example may be performed by a single entity in an alternative example.
  Information carried by a particular message in one example may be carried by two or more separate messages in an alternative example.
  Information carried by two or more separate messages in one example may be carried by a single message in an alternative example.
  The order in which operations are performed and/or the order in which messages are transmitted may be modified, if possible, in alternative examples.

Certain examples of the present disclosure may be provided in the form of an apparatus/device/network entity configured to perform one or more defined network functions and/or a method therefor. Certain examples of the present disclosure may be provided in the form of a system (e.g., network or wireless communication system) comprising one or more such apparatuses/devices/network entities, and/or a method therefor.

In the present disclosure, a UE may refer to one or both of Mobile Termination (MT) and Terminal Equipment (TE). MT may offer common mobile network functions, for example one or more of radio transmission and handover, speech encoding and decoding, error detection and correction, signalling and access to a SIM. An IMEI code, or any other suitable type of identity, may attached to the MT. TE may offer any suitable services to the user via MT functions. However, it may not contain any network functions itself AI/ML Application may be part of TE using the services offered by MT in order to support AI/ML operation, whereas AI/ML Application Client may be part of MT. Alternatively, part of AI/ML Application client may be in TE and a part of AI/ML application client may be in MT.

The procedures disclosed herein may refer to various network functions/entities. The functions and definitions of certain network functions/entities, for example those indicated below, are known to the skilled person, and are defined, for example, in at least [2] and [3]:
  AI/ML Application Function: AI/ML AF
  Network Exposure Function: NEF
  Unified Data Repository: UDR
  Policy Control Function: PCF
  Session Management Function: SMF
  User Plane Function: UPF
  Access and Mobility management Function: AMF
  User Equipment: UE However, as noted above, the skilled person will appreciate that the present disclosure is not limited to the definitions given in [2] and [3], and that equivalent functions/entities may be used.

As noted above, as part of the study item for Rel-18 in SA WG2, an issue was approved with the scope of monitoring the network resource utilization for support of Application AI/ML operations. Another issue was also approved with the scope of Quality of Service (QoS) and policy enhancements for AI/ML-based services. As part of this issue, it was agreed to study QoS monitoring aspects to support the operation of the 3rd party AI/ML operation.

The following requirements related to the above context have been approved for the 5G system:
  Based on operator policy, the 5G system shall be able to provide means to allow an authorized third-party to monitor the resource utilisation of the network service that is associated with the third-party.
    NOTE 1: Resource utilization in the preceding requirement refers to measurements relevant to the UE's performance such as the data throughput provided to the UE.
  Based on operator policy, the 5G system shall be able to provide an indication about a planned change of bitrate, latency, or reliability for a QoS flow to an authorized 3rd party so that the 3rd party AI/ML application is able to adjust the application layer behaviour if time allows. The indication shall provide the anticipated time and location of the change, as well as the target QoS parameters.
  Based on operator policy, 5G system shall be able to provide means to predict and expose predicted network condition changes (i.e., bitrate, latency, reliability) per UE, to an authorized third party.

Subject to user consent, operator policy and regulatory constraints, the 5G system shall be able to support a mechanism to expose monitoring and status information of an AI-ML session to a 3rd party AI/ML application.

NOTE 2: Such mechanism is needed for AI/ML application to determine an in-time transfer of AI/ML model.

Certain examples of the present disclosure provide one or more techniques for monitoring features and capabilities to support AI/ML-based services and operations, for example over the 5G System. In certain examples, application AI/ML operations may be understood as including model splitting, model sharing, federated/distributed learning, etc. However, the skilled person will appreciate that the present disclosure is not limited to these examples.

Certain examples of the present disclosure provide a method for monitoring events in a network, the method comprising: subscribing, by an Application Function (AF), to monitoring the events, wherein the AF supports one or more AIML-based services and/or operations, and the events relate to the performance of the AIML-based services and/or operations; in response to the subscribing, monitoring, by a User Plane Function (UPF), the events; and when an event is detected, reporting, by the UPF to a Network Exposure Function (NEF), the event.

In certain examples, the method may further comprise, reporting, by the NEF to the AF, one or more parameters related to the event.

In certain examples, the event may be reported by the UPF to the NEF directly.

In certain examples, reporting, by the UPF to the NEF, the event may comprise: reporting, by the UPF to a Session Management Function (SMF), the event; and reporting, by the SMF to the NEF, the event.

In certain examples, the monitoring events may comprise one or more of: monitoring session inactivity of a PDU session; monitoring traffic volume of a PDU session; monitoring PCF events; per-5QI monitoring; and monitoring of edge resources.

In certain examples, the monitoring may comprise QoS monitoring and may be performed for multiple UEs.

Certain examples of the present disclosure provide a method for monitoring traffic volume of a PDU session in a network, the method comprising: subscribing, by an Application Function (AF), to monitoring events for traffic volume; in response to the subscribing, monitoring, by a User Plane Function (UPF), traffic volume of the PDU session; when a traffic volume event is detected, reporting, by the UPF to a Network Exposure Function (NEF), a parameter including information on the traffic volume; reporting, by the NEF to the AF, one or more parameters related to the event.

Certain examples of the present disclosure provide a network (or wireless communication system) comprising one or more network entities (e.g., AF, UPF, NEF and/or SMF) configured to operate according to a method of any example, aspect, embodiment and/or claim disclosed herein.

Certain examples of the present disclosure provide a computer program comprising instructions which, when the program is executed by a computer or processor, cause the computer or processor to carry out a method according to any example, aspect, embodiment and/or claim disclosed herein.

Certain examples of the present disclosure provide a computer or processor-readable data carrier having stored thereon a computer program according to any example, aspect, embodiment and/or claim disclosed herein.

Certain examples of the present disclosure may provide one or more of the following monitoring features and capabilities, for example as part of the 5G System:

Support for monitoring of QoS parameters relevant to the performance of AI/ML-based services at the UE and the application AI/ML operation. Non-limiting examples of such parameters may include one or more of packet delay, traffic/data volume, and any other suitable parameter(s).

Support for monitoring of N4 session related parameters relevant to the application AI/ML operations. Non-limiting examples of such parameters include one or more of session inactivity timer, and any other suitable parameter(s).

Support for Application Function (AF) subscription to a series of NWDAF analytics relevant to the application AI/ML operation and performance. Non-limiting examples of such analytics include one or more of DN performance, UE communication, QoS sustainability, for example as defined in 3GPP TS 23.288 (Architecture enhancements for 5G System (5GS) to support network data analytics services), and any other suitable analytics.

Support for new Policy Control Function (PCF) events enabling the PCF reporting of the information described above related to AI/ML-based services (e.g., to the NEF or AF) and/or AI/ML operation.

Support for per-5QI (5G QoS Identifier) monitoring mechanisms for AWL-based services and operations. A non-limiting example includes separate monitoring support of traffic 5QI for collected data for training and traffic 5QI for shared models.

Support for monitoring of edge resources related to the AI/ML-based services and operations.

The skilled person will appreciate that the examples of monitoring features and capabilities described above is not exhaustive. Other monitoring features and capabilities directly or indirectly supporting AWL-based services are also possible.

Certain examples of the present disclosure may provide specific capabilities and features enabling monitoring of relevant AWL-based services and operations according to one or more of the following examples:

AF monitoring of UL, DL and/or round trip packet delay measurement: the three application AI/ML operations defined in TS 22.261 [1] (model split, model distribution, FL) may benefit from AF packet delay monitoring as the AI/ML application server may schedule training operation at UEs according to application needs, and delay measurements can assist the server in determining what the best strategy for such scheduling is. For example, delay measurements of the UE members of an FL group may assist the application server to decide which UEs need to provide model updates in each iteration. Delay information may also be critical for model split during joint inference, when sharing of inference results may be critical for application performance. Current specifications already detail how the AF monitors this parameter for URLLC services.

AF monitoring of traffic/data volume: AF knowledge on the traffic/data volume may help the application server to decide on the AI/ML operations that may be suitable for the application. For example, it may not be convenient to share or distribute very large models frequently, but smaller size models could be shared frequently. Similarly, there are important implications for model splitting depending on the traffic/data volume that needs to be exchanged between UE and application server, and the application server may need to monitor information on traffic/data volume, for example to decide models' optimal splitting points. In current specifications the UPF is already capable of monitoring this parameter and reporting it to the SMF. Certain examples of the present disclosure enable the AF to trigger the monitoring procedure and the SMF to deliver the report to the AF via the NEF.

AF monitoring of session inactivity time: when a training operation is to be scheduled by an AI/ML application server, either for a single UE or a group of UEs engaged in FL, awareness of session inactivity time as reported by the UPF to the SMF may be very helpful as it aids the server to determine when a UE or a group of UEs is sharing specific types of AI/ML traffic such as trained models. In particular, the dynamicity of FL groups may greatly benefit from this parameter as UE's may dynamically join or leave the group in a pre-scheduled way (therefore optimizing performance) with assistance of this parameter. In current specifications the UPF is already capable of monitoring this parameter and reporting it to the SMF. Certain examples of the present disclosure enable the AF to trigger the monitoring procedure and the SMF to deliver the report to the AF via the NEF.

In some examples, if the application has monitoring capabilities to accurately determine traffic volume and session inactivity, then 5GS monitoring capabilities for traffic/data volume and session inactivity time may not be required.

AF subscription to NWDAF analytics (e.g., DN performance, UE communication, QoS sustainability), which may assist the AI/ML application operation and is already supported. Current specifications already detail how the AF subscribes to these analytics.

FIG. 1 illustrates an example call flow according to an example of the present disclosure. The procedure in FIG. 1 is based on a combination of certain procedures, for example the procedures in clauses 4.15.16.6, 4.16.5, and 4.4.2.2 of TS 23.502 [3]. However, referring to FIG. 1, further modifications are described in the following operations.

In operation 1, the AF subscribes to NWDAF analytics relevant to the performance of the UE(s) using the AI/ML application over (a) PDU Session(s) (e.g., DN performance, UE communication, QoS sustainability).

In operation 2, the AF utilizes the Nnef_AFsessionWithQoS service to indicate a subscription to notifications of QoS monitoring for UE traffic related to AWL-based services, including packet delay measurement parameter, for example as described in clause 5.33.3 of TS 23.501 [2] for the case of URLLC services. Other requested monitored resources may include usage report and inactivity timer.

Operations 2b and 3 may be performed, for example according to FIG. 4.15.6.6-1 in TS 23.502 [3], when the NEF determines to contact the PCF directly. The requested resource monitoring capabilities are forwarded to the PCF.

In certain examples, operation 4 may be performed instead of operations 1-3 when the AF is trusted by the operator to interact directly with the PCF to request monitoring capabilities for an AF session related to AWL-based services.

Operations 5 and 6 may be performed, for example according to clause 4.16.5.2 of TS 23.502 [3], for the case when the PCF determines that the SMF needs updated policy information.

Operations 7-11 may be performed, for example, as steps 4, 5 and 6 in FIG. 4.15.6.6-1 of TS 23.502 [3] as applied in the case when QoS monitoring is requested for URLLC services without involvement of TSCTSF. In certain examples, operations 9 and 11 may be performed instead of 7, 8 and 10 when the AF is trusted by the operator.

Operations 12-15 may be performed, for example, according to clause 4.4.2.2 of TS 23.502 [3], where the N4 session report may include UL/DL/round trip packet delay measurement, usage report, PDU session inactivity.

Operations 16 and 17 may be performed, for example, according to clause 4.16.5.1 of TS 23.502 [3], providing the event condition(s) that have been met to the PCF.

Operations 18-19 may be performed, for example, as steps 7-8 in FIG. 4.15.6.6-1 of TS 23.502 [3] with the event information reported by the PCF. In certain examples, operation 20 may be performed instead when the AF is trusted by the operator.

In operation 21, the AF analyses the monitored information exposed by the 5GS related to the AI/ML traffic.

In operation 22, if needed, the AF may trigger a modification of the PDU Session after having analysed the monitored data.

The procedure illustrated in FIG. 1 may also be applied to QoS monitoring in certain examples as described in the following. The procedure in FIG. 1 is based on a combination of certain procedures, for example the procedures in clauses 4.15.6.6, 4.16.5 and 4.4.2.2 of 3GPP TS 23.502 [3]. However, referring to FIG. 1, further modifications are described in the following operations.

In operation 1, the AF subscribes to NWDAF analytics relevant to the performance of the UE(s) using the AI/ML application (e.g., DN performance, UE communication, QoS sustainability).

In operation 2, the AF uses the Nnef_AFsessionWithQoS service to indicate a subscription to notifications of QoS monitoring for delay measurements of UE traffic related to AI/ML-based services. Hence, the AF request may indicate a packet delay measurement parameter (UL, DL, and/or round trip), for example as described in clause 5.33.3 of TS 23.501 [2] and clause 5.2.6.9 of TS 23.502 [3] for the case of URLLC services.

Operations 2b and 3 may be performed, for example according to FIG. 4.15.6.6-1 in TS 23.502 [3], when the NEF determines to contact the PCF directly. The NEF interacts with the PCF by triggering a Npcf_PolicyAuthorization Create request for session management policy control to authorize the AF request and optionally subscribe to PCF events for measurement of packet delay.

In certain examples, operation 4 may be performed instead of operations 1-3 when the AF is trusted by the operator to interact directly with the PCF to request monitoring capabilities for an AF session related to AWL-based services.

In operations 5 and 6, if the PCF determines that the SMF needs updated policy information (for example as is the case for the monitoring parameters in this example), the PCF issues a Npcf_SMPolicyControl_UpdateNotify request with updated policy information, for example as described in the PCF initiated SM Policy Association Modification procedure in clause 4.16.5.2 of TS 23.502 [3]. The SMF then acknowledges the PCF request with a Npcf_SMPolicyControl_UpdateNotify response.

In operations 7-9, the PCF determines whether the request is authorized and notifies the AF if the request is not authorized via the NEF or directly by issuing a Npcf_PolicyAuthorization Create response message.

In operations 10 and 11, the NEF or AF may send a Npcf_PolicyAuthorization Subscribe message to the PCF to subscribe to the notification of the PCF events for measurement of packet delay measurement if not done so previously in operation 3.

In operations 12-15, after receiving the event subscription notification from the PCF, the SMF issues an N4 Session Modification Request, for example as described in clause 4.4.1.3 of TS 23.502 [3], configuring the triggers for event reporting in the UPF. The reporting triggers configured by the SMF may entail session reports for packet delay measurement. The UPF may report on these events, for example according to clause 4.4.2.2 of TS 23.502 [3].

Operations 16-17 may be performed, for example according to clause 4.16.5.1 of TS 23.502 [3], with the SMF providing the event condition(s) that have been met to the PCF.

Operations 18-19 may be performed, for example, as steps 7-8 in FIG. 4.15.6.6-1 of TS 23.502 [3] with the event information reported by the PCF to the AF via the NEF in case of the AF is untrusted. In certain examples, operation 20 may be performed instead when the AF is trusted by the operator.

In operation 21, the AF analyses the monitored information exposed by the 5GS related to the AI/ML traffic.

In operation 22, if needed, the AF may trigger a modification of the PDU Session after having analysed the monitored data (for example, see also clause 4.15.6.6a of TS 23.502 [3], without the need for TSCTSF involvement).

FIG. 2 illustrates an example call flow according to another example of the present disclosure. In particular, FIG. 2 illustrates a procedure for monitoring of session inactivity time and traffic volume.

In operation 1, the AF uses the Nnef_EventExposure Subscribe service operation to indicate a subscription to new NEF monitoring events for traffic volume and/or session inactivity time.

In operation 2, the NEF subscribes to the user plane status information SMF event, for example described in clause 5.2.8.3.1 of TS 23.502 [3], providing the (AI/ML) application ID and the SUPI(s) of the UE(s) being monitored as event filters, for example as described in Table 5.2.8.3.1-1 of TS 23.502 [3].

In operations 3 and 4, after receiving the event subscription notification from the NEF, the SMF issues an N4 Session Modification Request, for example as described in clause 4.4.1.3 of TS 23.502 [3], configuring the trigger for event reporting in the UPF of PDU session inactivity.

In operation 5, the NEF may subscribe to event exposure from the UPF to obtain information on data usage of a PDU session. For example, the event may be UserDataUsageMeasures. This event provides information of user data usage of the User PDU Session, for example Volume Measurement and Throughput Measurement.

In operation 6, a trigger happens to report events on session inactivity and/or traffic usage by the UPF.

In operation 7, when a PDU session inactivity event is detected, the UPF reports it to the SMF, for example according to clause 4.4.2.2 of TS 23.502 [3].

In operation 8, the SMF reports the detection of a user plane status information event to the NEF with information on session inactivity time.

In operation 9, the UPF reports to the NEF the detection of the event in operation 5 with information on data usage of a PDU session.

In operation 10, the NEF reports the monitored session inactivity time and/or traffic volume to the AF via Nnef_EventExposure Notify service operation.

In operation 11, the AF analyses the monitored information exposed by the 5GS related to the AI/ML traffic.

In operation 12, if needed, the AF may trigger a modification of the PDU Session after having analysed the monitored data.

The skilled person will appreciate that the techniques described herein may be used to support both AI/ML-based services (e.g., robotics, computer vision, etc.) and AWL model operations that can be done in the network (e.g., AI/ML operation splitting, AI/ML model/data distribution and sharing, and distributed/federated learning). The techniques described herein may improve the performance of such services and operations. The skilled person will also appreciate that certain examples of the present disclosure may also be applied to non-AI/ML related network aspects.

FIG. 3 illustrates a block diagram of an exemplary network entity that may be used in examples of the present disclosure, such as the techniques disclosed in relation to FIGS. 1 and/or 2. For example, the UE, AF, NEF, PCF, SMF, UPF, NWDAF and/or other NFs may be provided in the form of the network entity illustrated in FIG. 3. The skilled person will appreciate that a network entity may be implemented, for example, as a network element on a dedicated hardware, as a software instance running on a dedicated hardware, and/or as a virtualised function instantiated on an appropriate platform, e.g., on a cloud infrastructure.

The entity 300 comprises a processor (or controller) 301, a transmitter 303 and a receiver 305. The receiver 305 is configured for receiving one or more messages from one or more other network entities, for example as described above. The transmitter 303 is configured for transmitting one or more messages to one or more other network entities, for example as described above. The processor 301 is configured for performing one or more operations, for example according to the operations as described above.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain examples provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the disclosure has been shown and described with reference to certain examples, it will be understood by those skilled in the art that various changes in form and detail may be made therein without departing from the scope of the disclosure, as defined by the appended claims.

Certain examples of the present disclosure provide one or more techniques as disclosed in the accompanying annex to the description. The skilled person will appreciate that any of these techniques may be applied in combination with any of the techniques described above and illustrated in the Figures.

Acronyms and Definitions

3 GPP 3$^{rd}$ Generation Partnership Project
5G 5$^{th}$ Generation
5GC 5G Core
5GS 5G System
5 QI 5G QoS Identifier
ADRF Analytics Data Repository Function
AF Application Function
AI Artificial Intelligence
AMF Access and Mobility management Function
DCCF Data Collection Coordination Function
DL Downlink
DN Data Network
ID Identity/Identifier
IMEI International Mobile Equipment Identities
MFAF Messaging Framework Adaptor Function
ML Machine Learning
MT Mobile Termination
N4 Interface between Control Plane and User Plane
NEF Network Exposure Function
NF Network Function
NRF Network Repository Function
NW Network
NWDAF Network Data Analytics Function
OAM Operations, Administration and Maintenance
PCF Policy Control Function
PDU Protocol Data Unit
PLMN Public Land Mobile Network
QoS Quality of Service
Rel Release
SIM Subscriber Identity Module
SMF Session Management Function
TE Terminal Equipment
TS Technical Specification
TSCTSF Time Sensitive Communication Time Synchronisation Function
UDM Unified Data Manager
UDR Unified Data Repository
UE User Equipment
UL Uplink
UPF User Plane Function
URLLC Ultra-Reliable Low-Latency Communication
WG Working Group Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network exposure function (NEF) for monitoring an event in a network, the method comprising:
   receiving, from an application function (AF) which supports one or more artificial intelligence/machine leaning (AI/ML)-based services, first information indicating a subscription for monitoring an event related to the AI/ML-based services;
   transmitting, to a session management function (SMF), second information for obtaining information on the event related to an inactivity time;
   transmitting, to a user plane function (UPF), third information for obtaining information on the event related to a traffic volume;
   receiving at least one of the information on the event related to the inactivity time or the information to the event related to the traffic volume; and
   transmitting, to the AF, one or more parameter obtained based on the at least one of the information on the event related to the inactivity time or the information on the event related to the traffic volume.

2. The method of claim 1,
   wherein the information on the event related to the traffic volume is reported by the UPF to the NEF directly, and
   wherein the information on the event related to the inactivity time is reported by the UPF to the NEF through the SMF.

3. The method of claim 1,
   wherein the event is associated with one or more of:
   a session inactivity of a protocol data unit (PDU) session, a traffic volume of a PDU session, policy control function (PCF) events, per-5G quality of service (QoS) identifier (5QI) monitoring, and edge resources.

4. A method performed by a user plane function (UPF) for monitoring an event in a network, the method comprising:
   receiving, from a session management function (SMF), first information for obtaining information on the event related to an inactivity time;
   receiving, from a network exposure function (NEF), second information for obtaining information on the event related to a traffic volume;
   monitoring at least one event based on the first information and the second information; and
   reporting at least one of the information on the event related to the inactivity time or the information on the event related to the traffic volume, in case that a trigger happens to report the at least one event.

5. The method of claim 4,
   wherein the information on the event related to the traffic volume is reported by the UPF to the NEF directly, and
   wherein the information on the event related to the inactivity time is reported by the UPF to the NEF through the SMF.

6. The method of claim 4,
   wherein the event is associated with one or more of:
   a session inactivity of a protocol data unit (PDU) session, a traffic volume of a PDU session, policy control function (PCF) events, per-5G quality of service (QoS) identifier (5QI) monitoring, and edge resources.

7. A method performed by an application function (AF) for monitoring an event in a network, the method comprising:
- transmitting, to a network exposure function (NEF), first information indicating a subscription for monitoring an event related to artificial intelligence/machine leaning (AWL);
- receiving, from the NEF, one or more parameter obtained based on at least one of information on the event related to an inactivity time or information on the event related to a traffic volume; and
- analyzing the one or more parameter for AI/ML traffic,
- wherein the AF supports one or more AI/ML-based services.

8. The method of claim 7,
- wherein second information for obtaining information on the event related to the inactivity time is transmitted to a user plane function (UPF) through the NEF and a session management function (SMF),
- wherein the information on the event related to the inactivity time is reported by the UPF to the NEF through the SMF,
- wherein third information for obtaining information on the event related to the traffic volume is transmitted to the UPF through the NEF, and
- wherein the information on the event related to the traffic volume is reported by the UPF to the NEF directly.

9. The method of claim 7,
- wherein the event is associated with one or more of:
- a session inactivity of a protocol data unit (PDU) session, a traffic volume of a PDU session, policy control function (PCF) events, per-5G quality of service (QoS) identifier (5QI) monitoring, and edge resources.

10. The method of claim 7, further comprising:
- triggering a modification of a protocol data unit (PDU) session based on analysis of the one or more parameter.

11. A network exposure function (NEF) for monitoring an event in a network, the NEF comprising:
- a transceiver; and
- a controller configured to:
  - receive, from an application function (AF) which supports one or more artificial intelligence/machine leaning (AI/ML)-based services, first information indicating a subscription for monitoring an event related to the AI/ML-based services,
  - transmit, to a session management function (SMF), second information for obtaining information on the event related to an inactivity time,
  - transmit, to a user plane function (UPF), third information for obtaining information on the event related to a traffic volume,
  - receive at least one of the information on the event related to the inactivity time or the information on the event related to the traffic volume, and
  - transmit, to the AF, one or more parameter obtained based on the at least one of the information on the event related to the inactivity time or the information on the event related to the traffic volume.

12. The NEF of claim 11,
- wherein the information on the event related to the traffic volume is reported by the UPF to the NEF directly, and
- wherein the information on the event related to the inactivity time is reported by the UPF to the NEF through the SMF.

13. The NEF of claim 11,
- wherein the event is associated with one or more of:
- a session inactivity of a protocol data unit (PDU) session, a traffic volume of a PDU session, policy control function (PCF) events, per-5G quality of service (QoS) identifier (5QI) monitoring, and edge resources.

14. A user plane function (UPF) for monitoring an event in a network, the UPF comprising:
- a transceiver; and
- a controller configured to:
  - receive, from a session management function (SMF), first information for obtaining information on the event related to an inactivity time,
  - receive, from a network exposure function (NEF), second information for obtaining information on the event related to a traffic volume,
  - monitor at least one event based on the first information and the second information, and
  - report at least one of the information on the event related to the inactivity time or the information on the event related to the traffic volume, in case that a trigger happens to report the at least one event.

15. The UPF of claim 14,
- wherein the information on the event related to the traffic volume is reported by the UPF to the NEF directly, and
- wherein the information on the event related to the inactivity time is reported by the UPF to the NEF through the SMF.

16. The UPF of claim 14,
- wherein the event is associated with one or more of:
- a session inactivity of a protocol data unit (PDU) session, a traffic volume of a PDU session, policy control function (PCF) events, per-5G quality of service (QoS) identifier (5QI) monitoring, and edge resources.

17. An application function (AF) for monitoring an event in a network, the AF comprising:
- a transceiver; and
- a controller configured to:
  - transmit, to a network exposure function (NEF), first information indicating a subscription for monitoring an event related to artificial intelligence/machine leaning (AI/ML),
  - receive, from the NEF, one or more parameter obtained based on at least one of information on the event related to an inactivity time or information on the event related to a traffic volume, and
  - analyze the one or more parameter for AI/ML traffic,
- wherein the AF supports one or more AI/ML-based services.

18. The AF of claim 17,
- wherein second information for obtaining information on the event related to the inactivity time is transmitted to a user plane function (UPF) through the NEF and a session management function (SMF),
- wherein the information on the event related to the inactivity time is reported by the UPF to the NEF through the SMF,
- wherein third information for obtaining information on the event related to the traffic volume is transmitted to the UPF through the NEF, and
- wherein the information on the event related to the traffic volume is reported by the UPF to the NEF directly.

19. The AF of claim 17,
- wherein the event is associated with one or more of:
- a session inactivity of a protocol data unit (PDU) session, a traffic volume of a PDU session, policy control function (PCF) events, per-5G quality of service (QoS) identifier (5QI) monitoring, and edge resources.

20. The AF of claim 17, wherein the controller is configured to trigger a modification of a protocol data unit (PDU) session based on analysis of the one or more parameter.

* * * * *